UNITED STATES PATENT OFFICE.

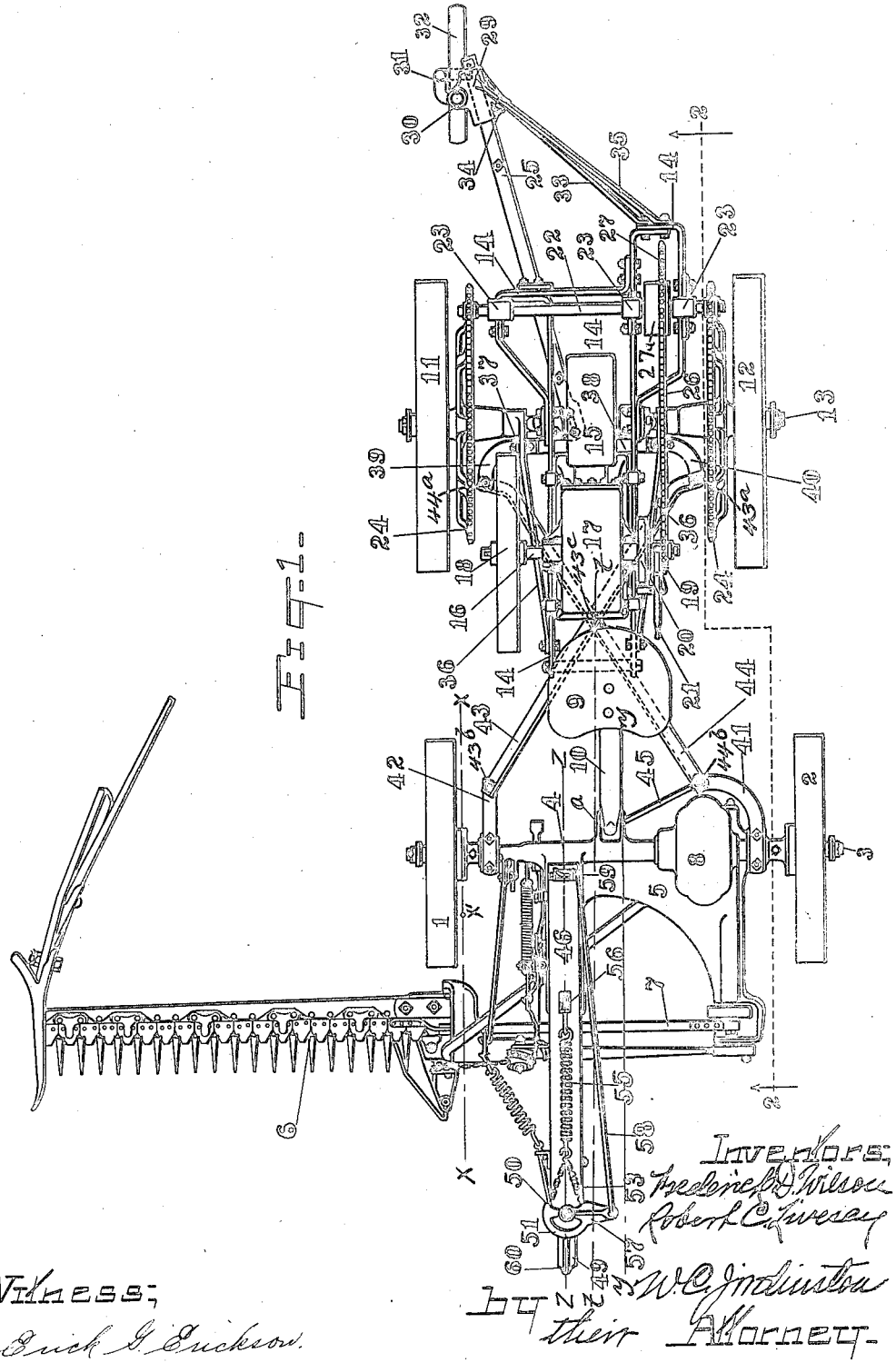

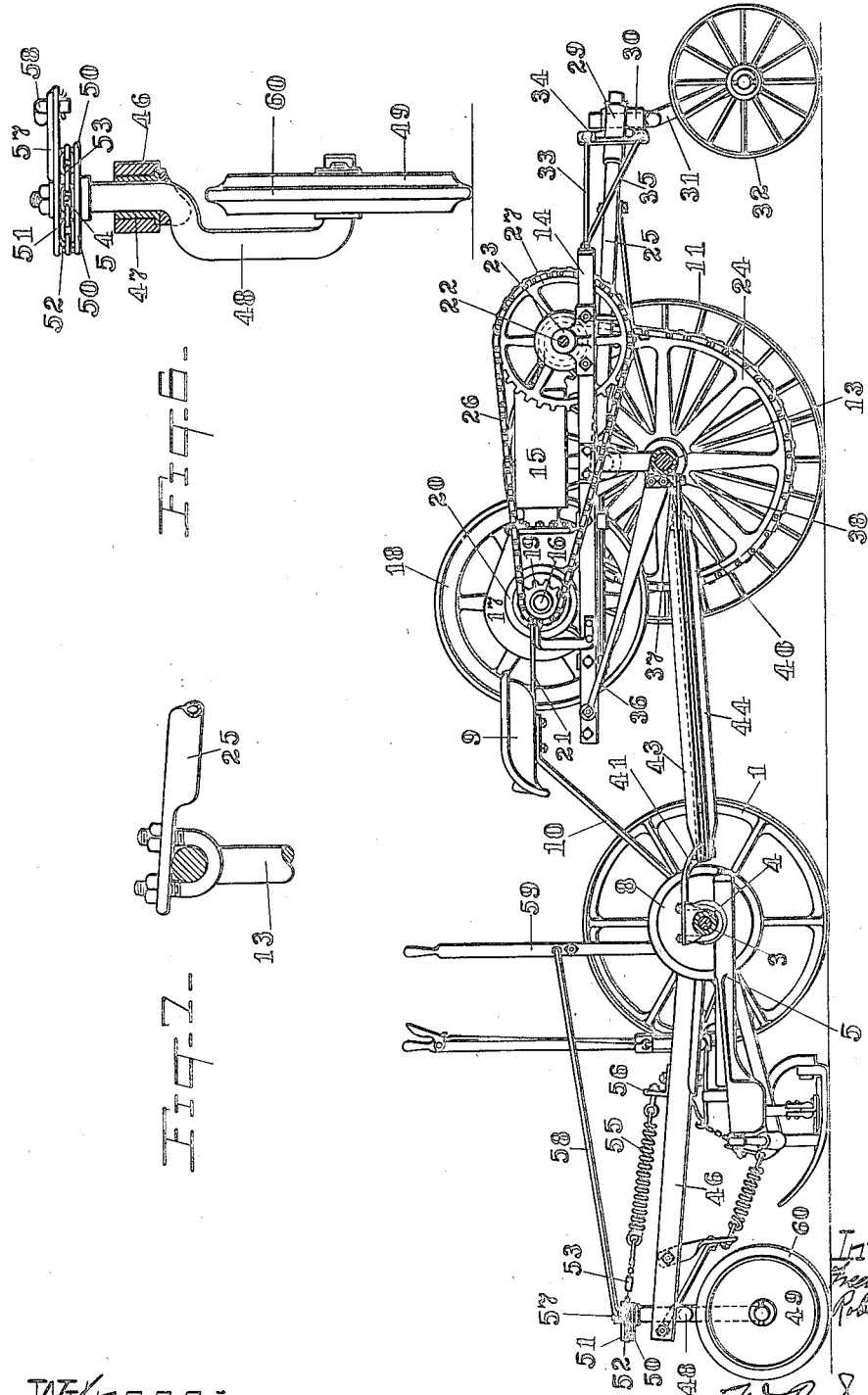

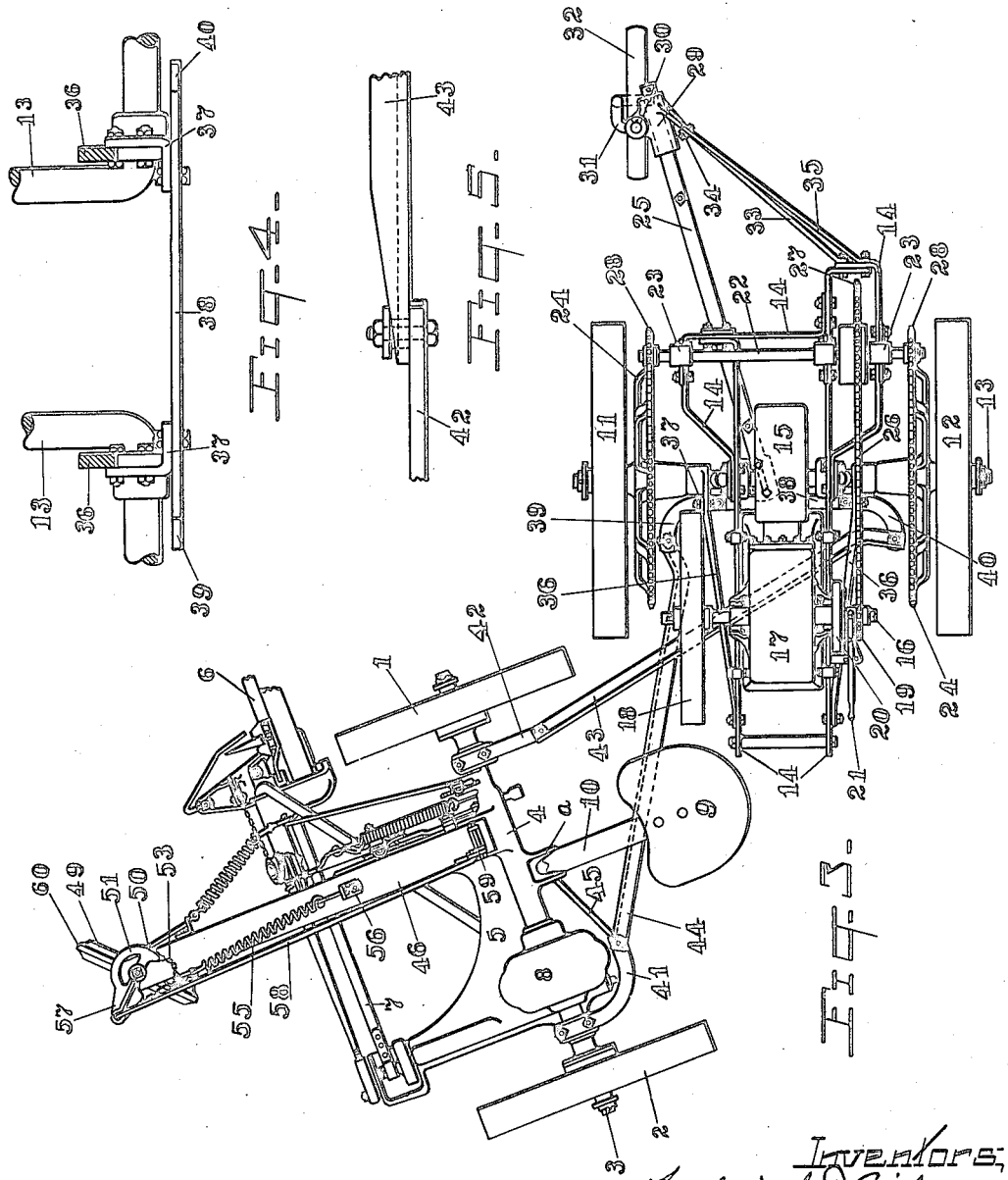

FREDERICK D. WILSON AND ROBERT C. LIVESAY, OF MOLINE, ILLINOIS, ASSIGNORS TO DEERE AND COMPANY, OF MOLINE, ILLINOIS, A CORPORATION OF ILLINOIS.

POWER-PROPELLED HARVESTER.

1,419,433. Specification of Letters Patent. Patented June 13, 1922.

Application filed June 26, 1917. Serial No. 177,020.

*To all whom it may concern:*

Be it known that we, FREDERICK D. WILSON and ROBERT C. LIVESAY, citizens of the United States, residing at Moline, in the county of Rock Island and State of Illinois, have invented certain new and useful Improvements in Power-Propelled Harvesters, of which the following is a specification, reference being had therein to the accompanying drawing.

Our invention relates to harvesters propelled by mechanical power, a mower being shown having a tractor connected to the rear thereof. The object of our invention is to provide a power mechanism flexibly connected to the rear of such a vehicle like structure and dirigible to follow the latter in its direction of travel.

Referring to the drawings in which similar numerals indicate identical parts—

Figure 1 is a plan view of a mower and a tractor flexibly connected.

Figure 2 is a side elevation in section on the line 2—2 of Figure 1.

Figure 3 is a plan view illustrating the positions of the mower, and tractor and connecting parts when turning.

Figure 4 is an enlarged front view of a portion of the tractor axle and connected parts.

Figure 5 is an enlarged detail view of one of the pivotal connections between the mower and tractor.

Figure 6 is an enlarged front view of the steering wheel and connections, and

Figure 7 shows a connection of the caster wheel support to the tractor.

The mower is of a well known type and includes supporting wheels 1 and 2 mounted on and having the universally common backing ratchet connections with an axle 3 journaled in a bearing 4 preferably integral with the frame 5. A cutter 6 of the usual type is connected to the frame 5 and is actuated in the usual way by a pitman 7 actuated by a crank shaft journaled on the frame 5 and driven by suitable gearing on the axle and enclosed in a casing 8 on the frame. The devices employed for raising and lowering the cutter may be of any desired type, and readily operable from a driver's seat 9 mounted on a support 10 secured on a projecting part *a* of the rear of the frame 5. The mower shown is to be understood as comprising all of the well known essential detail parts characteristic of such a vehicle many of which are not illustrated or are merely conventionally indicated.

Traction wheels 11 and 12 are mounted to rotate on an arched axle 13. A frame 14, formed preferably of bars bent to a desired shape and bolted together is secured on the axle 13 and on it we mount a motor 15 having a crank shaft 16 suitably supported and housed in a casing 17. On one end of the crank shaft 16 is a fly wheel 18 and on the opposite end a sprocket 19 is loosely mounted and is adapted to be connected to the shaft 16 to, rotate therewith, by a clutch as at 20 which is operable by a lever 21 convenient to the reach of the operator. A countershaft 22 is mounted to rotate in bearings 23 on the tractor frame, and power is transmitted thereto from the motor by a chain connection 26 from the sprocket 19 to a sprocket 27 of the usual compensating gear of any well known sort at $27^a$ on the counter shaft.

On the ends of the countershaft 22 are rigidly secured sprockets 28 which are connected to sprockets 24 on the axle 13 and rigidly attached to the wheels 11 and 12 respectively.

Rigidly secured to the arch of the axle 13 is a beam 25 extending rearwardly and grassward at an angle to the line of travel of the tractor; on the rear termination of the beam 25 is mounted a casting 29 having a vertical bearing 30. A caster wheel 32 is mounted on a crank axle 31 having a vertical spindle journaled to rotate freely in the bearing 30. A brace 33 extends from the stubbleward rear of the frame and is secured above the beam 25 to a vertically disposed member 34 rigidly connected to the casting 29; a similar brace 35 is secured to the frame, adjacent the brace 33, and, extends to the member 34 to which it is bolted below the beam 25.

The tractor is connected to the mower in the following manner; braces 36 are secured to the arched axle 13, on opposite sides of the arch, and extend forwardly and upwardly to the sides of the forward end of the tractor frame to which they are securely bolted. Rigidly mounted on the braces 36 adjacent the axle 13 are depending L shaped brackets 37, more clearly shown in Figure 4, to which is rigidly secured a horizontally laterally disposed member 38 having its ends 39 and 40 bent to extend forwardly.

Extending rearwardly from the mower frame 5, and rigidly bolted to the tubular portion 4 thereof, are arms 41 and 42. Pivotally connected to the arm 42 is a reach or push bar 43 which extends diagonally rearward to pivotal connection with the end 40 of the member 38; a similar reach or push bar 44 is pivotally connected to the arm 41 and to the end 39 of the member 38. A brace 45 extends from the arm 41 to the part $a$ of the mower frame 5.

Mounted on the frame 5, and rigidly secured thereto is a stub pole or tongue 46 which occupies the same relative position on the frame as the pole or tongue of a horse drawn mower. Journaled to turn in a bearing 47, on the stub pole 46, is the vertical end portion of a crank axle 48; a guide wheel 49 is mounted to revolve freely on the lower horizontal end of the crank axle 48. On the upper end of the crank axle 48 is a horizontally disposed member 50, having a semi-circular sheave 51, in the forward edge of which is a groove 52 for the reception of a chain 53 which is retained therein by a pin 54 on the member 50 and engaging with the central link of the chain. The ends of the chain extend convergingly an equal distance rearward of the member 50 and are connected to a coil spring 55 extending along the stub pole 46 and secured to a bracket 56 thereon.

Extending preferably stubbleward from the member 50 is an arm 57 to the end of which is connected a rod 58, the latter extending rearward to connection with a lever 59 pivotally mounted on the rear end of the stub pole 46. The steering wheel 49 is provided with a circumferential rib 60 on its tread face to ensure a firm purchase with the ground.

As shown in Figure 1 the combined machine is in operation cutting straight ahead and it is presumed that it is desired to turn to cut in another direction, the operator rocks the lever 59 forwardly, and as the lever is connected to the arm 57 by the rod 58, the crank axle 48 is rotated toward the cut, in this instance to the right, the guide wheel 49 is consequently swung to the right, the mower following the lead of the guide wheel 49 until the mower is headed in the desired direction; the operator then releases the lever 59, and the spring 55, which has been extended by the movement of the arm 57, automatically returns the arm 57 and the guide wheel 49 to the position shown in Figure 1 for a straight ahead movement of the mower. The rib 60 of the steering wheel 49 gives to the latter a firm hold on the ground, and upon swinging the wheel in the desired direction the mower is instantly responsive and the turning movement is very short.

As the mower turns the tractor is moving ahead on the original line of travel until the mower and tractor are substantially in the positions shown in Figure 3. As the mower turns the crossed push bars or reaches 43 and 44 change their joint pushing action upon the mower, the reach secured to the mower on the side toward which the turn is made, in this instance the reach 43, tends to hold that side of the mower, and the opposite reach, in this instance the reach 44, is operating by the propelling force of the tractor to rapidly swing the mower in the direction of the turn. When the parts have reached the position shown in Figure 3, or when the desired change of direction for the mower has been practically completed the lever 59 is released by the operator and the steering wheel 49 is swung back into line and retained in the new direction of travel by the action of the coiled spring 55. At this time the tractor has begun to follow the lead of the mower and is steered thereby until it is again in line with the new direction of travel, the caster wheel 32 operating to follow any movement of the tractor.

It will be seen that if the front element of the apparatus, to-wit: the front vehicle and its laterally projecting load-carrying part (here a mower cutter-bar) be considered by itself, as a unit, such unit will tend, when in operation, to vibrate horizontally (the wheel 2 swinging forward and back, and the parts at 6 swinging similarly but oppositely) around a vertical line. The vertical longitudinal plane which includes this vertical line is considerably to the right of the vertical longitudinal plane intersecting the central part of the front axle of wheels 1 and 2. The central vertical longitudinal plane first referred to is conventionally indicated by line $x$—$x$, Fig. 1. And the vertical line in that plane around which the front vehicle and its laterally projecting load-carrying attachment will, (if independent of the rear vehicle) oscillate horizontally, is conventionally indicated by the point $x'$. And the second vertical longitudinal plane, above referred to, including the vertical line at the center of the wheel axle, is indicated by $y$—$y$. When the laterally projecting part at 6 is loaded or resisted it tends to swing the parts extending toward the left from the plane at $x$—$x$ forward, the load or resistance tending to relatively stop, or hold stationary, the load-carrying part.

But if the two vehicles are considered together and as connected (for example, in the manner shown) the forward swing around the point at $X'$ of the parts at the left hand extremity of the forward vehicle is resisted, the rear vehicle acting as a load upon such left-hand part of the forward vehicle.

Hence, the vertical longitudinal plane which actually contains the vertical line of horizontal swing of the parts typified by those indicated at 2 and at 6, will be somewhat to the left of the aforesaid plane $x$—$x$. And this third plane referred to is indicated by the line $z$—$z$. The front steering wheel 49 is positioned so as to normally rotate as near as practicable in this plane $z$—$z$, in order that the loads or resistances to the right and to the left of said plane shall be approximately equal, and the apparatus when at work be assisted in maintaining continuous travel along predetermined straight lines.

And as concerns the transmission of the power from the rear vehicle to the forward one: It will be seen that the reaches or thrust bars 43, 44, are connected to the rear vehicle and to the forward vehicle in a peculiar manner. The rear pivots at $43^a$ and $44^a$ at the rear ends of these bars are substantially equi-distant, respectively, from the vertical longitudinal planes of the adjacent ground wheels 11 and 12. But the front ends of these thrust bars or reaches are, respectively, quite differently connected to the forward or loaded vehicle. The front pivot at $43^b$ of the thrust bar 43 is comparatively close to the longitudinal plane of the front ground wheel 1, while the front pivot $44^b$ of the other thrust bar 44 is at least twice as far from the corresponding plane of the neighboring ground wheel 2. The abutment bar 41 above referred to is carried or curved inward to carry this pivot connection.

The vertical longitudinal plane which includes the vertical line at $43^c$ where the two lines of thrust cross each other is the median plane of thrust. And this plane, it will be seen, is considerably to the right of the above specified plane at $y$—$y$ and somewhat to the left of the plane $z$—$z$, this thrust plane being indicated by $t$—$t$. Consequently the power is applied as near as practicable to the median plane $z$—$z$ of the loads which is remote from the central plane of the front vehicle, and is applied in such way that the resistance from the steering wheel (when angulated to the right) to the forward pushing action, is eliminated.

Preferably the four hinging points of the thrust bars or reaches 43, 44 are, when the apparatus is at work, at the angles of a quadrilateral which is approximately rectangular; and, therefore, when the other conditions above described exist, the wheel base of the forward vehicle is considerably wider than the base of the rear one.

When the steering wheel is turned to cause the front vehicle to turn to the right, the speed of the outer front wheel 2 is increasingly augmented during the turn and, relatively, the inner or right hand front wheel 1 becomes a pivot. During such turning the efficient radius of the thrust bar or reach 44 lengthens (that is, the distance between the vertical line of the rear pivot $44^a$ and the vertical line of the ground contact point of the front wheel 2) as will be seen by comparing the relative positions of reach 44 and wheel 2, respectively, as shown in Figs. 1 and 3. On the contrary, the corresponding radial distance from the pivot at $43^a$ to the inner wheel 1 of the front vehicle remains approximately constant or slightly lessens as the turning proceeds. Hence the front part of the apparatus can be sharply turned so that it will be carried quickly from one line of advance to another at right angles thereto.

After the two vehicles have (in making the turn) reached the relative positions shown in Fig. 3, the inner extreme part of the forward vehicle being relatively stationary or slowed down in its advance, the outer wheel 12 of the rear vehicle is caused, under forward propelling impulse from the tractor vehicle, to swing toward the right under the guidance of the bar 43, the forward end of which is approximately stationary with the wheel 1, and at the same time, the same forward advancing impulse pushes the outer forward wheel 2 farther to the right until finally the two vehicles are brought again into parallelism as illustrated in Fig. 1, and the entire apparatus is, by proper manipulation of the steering wheel, brought to a line of travel at right angles to that indicated in Fig. 1.

The vertical plane of the reach 43 includes the axis of the pivot $43^a$ and also the vertical line of the ground contacting point of wheel 1. But the vertical plane of the bar 44 while including the vertical line of the pivot at $44^a$ lies considerably ahead of the vertical line of the ground contacting point of the wheel 2.

What we claim is—

1. The combination of a forward power propelled vehicle having its load carrying element positioned laterally eccentrically relatively to the central longitudinal vertical plane of the vehicle optionally controlled steering mechanism mounted on the front vehicle for changing its direction of movement, and a rear power propelling vehicle connected to the forward vehicle by devices permitting the forward vehicle, while advancing, to turn laterally relatively to the rear vehicle, said connecting devices transmitting power by thrust to the forward vehicle, the median longitudinal plane of power application being remote from the central vertical plane of the forward vehicle in the direction of the load carrying element, the rear vehicle being steered by the forward one.

2. The combination of a front vehicle having its load carrying element positioned laterally remote from the central longitudinal vertical plane of the vehicle and having two ground wheels or an axis near its rear end, the rear power vehicle, and the two thrust bars connected by pivots to the rear vehicle and connected by pivots to the front vehicle, the lines connecting each of the four pivots to the next defining, when the apparatus is working along straight lines, a rectangle which is positioned nearer to one of the rear ground wheels of the front vehicle than to the other.

3. The combination of a front vehicle having its load carrying element positioned laterally remote from the central longitudinal vertical plane of the vehicle, the rear power vehicle, the two cross reaches, each connected by a pivot to the rear vehicle and by a pivot to the front vehicle, the distance, transversely, between the rear pivots being equal to the distance between the front pivots, the distance between one of the front pivots and the adjacent ground wheel of the front vehicle being greater than the distance from the other front pivot to the vertical plane of the opposite front ground wheel.

4. The combination of a front vehicle, the rear power vehicle, and the crossed thrust bars or reaches, respectively pivoted to the rear vehicle and to the front vehicle, the front pivots being positioned at unequal distances laterally from the central longitudinal line of the front vehicle, to cause one of said wheels to travel relatively slowly and cause the other front wheel to travel relatively faster while turning.

5. The combination of a front vehicle, the rear power vehicle, and the crossed reach bars each pivotally connected to the front vehicle and to the rear vehicle, one bar being normally positioned in the plane containing the vertical line of the ground contacting point of one of the front wheels and the other bar normally positioned in a plane which contains the rear pivot line of said bar but normally lies in front of the vertical line of the ground contacting point of the other front ground wheel.

6. The combination of a front vehicle, the rear vehicle, and the reaches each pivoted to the rear vehicle and to the front vehicle, the front pivot of one reach holding the adjacent front ground wheel approximately stationary relatively to the opposite rear ground wheel when the front vehicle is bodily turning, and the other front pivot being positioned to cause the front vehicle to move bodily around the aforesaid front ground wheel while the rear vehicle is advancing.

7. The combination of a front vehicle with the laterally extending load element, the rear vehicle and the steering wheel in the longitudinal vertical plane which includes the vertical axis around which the load carrying element tends to swing the front vehicle, said plane being remote, in the direction of the load carrying element, from the central vertical longitudinal plane of the front vehicle.

8. The combination of a front vehicle with the laterally extending load carrying element, the rear vehicle, the steering wheel in the longitudinal vertical plane that includes the vertical axis around which the load carrying element tends to swing the front vehicle, said plane being remote, in the direction of the load element, from the central longitudinal vertical plane of the front vehicle, and the thrust bars or reaches transmitting power from the rear vehicle to the front one and arranged to have the median vertical lonigtudinal plane of power application positioned between the two planes aforesaid.

9. The combination of a front vehicle, the rear power vehicle, the cross reaches respectively connected pivotally to both of said vehicles, the optionally turned steering wheel means on the front vehicle for mounting said wheel, the automatically swinging caster wheel, the means for mounting the caster wheel on the rear vehicle, the mounting means of the steering wheel being bodily movable laterally independently of the means for mounting the caster wheel.

In testimony whereof we affix our signatures, in presence of two witnesses.

FREDERICK D. WILSON.
ROBERT C. LIVESAY.

Witnesses:
JESSIE SIMSER,
W. G. DUFFIELD.